United States Patent [19]
Morikawa

[11] Patent Number: 5,668,714
[45] Date of Patent: Sep. 16, 1997

[54] CONTROL SYSTEM FOR MULTI-PROCESSOR APPARATUS

[75] Inventor: Hisashi Morikawa, Kawasaki, Japan

[73] Assignee: Fujitsu Limited, Kanagawa, Japan

[21] Appl. No.: 662,264

[22] Filed: Jun. 7, 1996

Related U.S. Application Data

[63] Continuation of Ser. No. 272,263, Jul. 8, 1994, abandoned.

[30] Foreign Application Priority Data

Sep. 16, 1993 [JP] Japan .................... 5-229990

[51] Int. Cl.$^6$ .................... G05B 15/02; G05B 19/18; G06F 9/44
[52] U.S. Cl. .................... 364/131; 364/133; 364/138; 395/670
[58] Field of Search .................... 364/131, 133, 364/138; 395/500, 800, 550, 200.06, 200.12, 200.13, 200.19, 650

[56] References Cited

U.S. PATENT DOCUMENTS 4,495,570 1/1985 Kitajima et al. .................... 395/650
5,050,070 9/1991 Chastain et al. .................... 395/375
5,155,858 10/1992 DeBruler et al. .................... 395/800

*Primary Examiner*—Paul P. Gordon
*Attorney, Agent, or Firm*—Helfgott & Karas, P.C.

[57] ABSTRACT

A control system controls a multi-processor apparatus having a plurality of processors in which each of the plurality of processors are assigned to a process. The control system includes a determining unit for determining whether or not an excess processor for the process is included in processors assigned to the process, and a releasing unit for, when the determining unit determines that an excess processor for the process is included in the processors assigned to the process, releasing the excess processor from the process. The control system may include a first determining unit for determining whether or not a number of processors assigned to the process is insufficient, a second determining unit for determining whether or not a processor which is not busy is included in the plurality of processors, and an adding unit for, when the first determining unit determines that the number of processors assigned to the process is insufficient and when the second determining unit determines that a processor which is not busy is included in the plurality of processors, adding the processor which is not busy to processors assigned to the process.

12 Claims, 12 Drawing Sheets

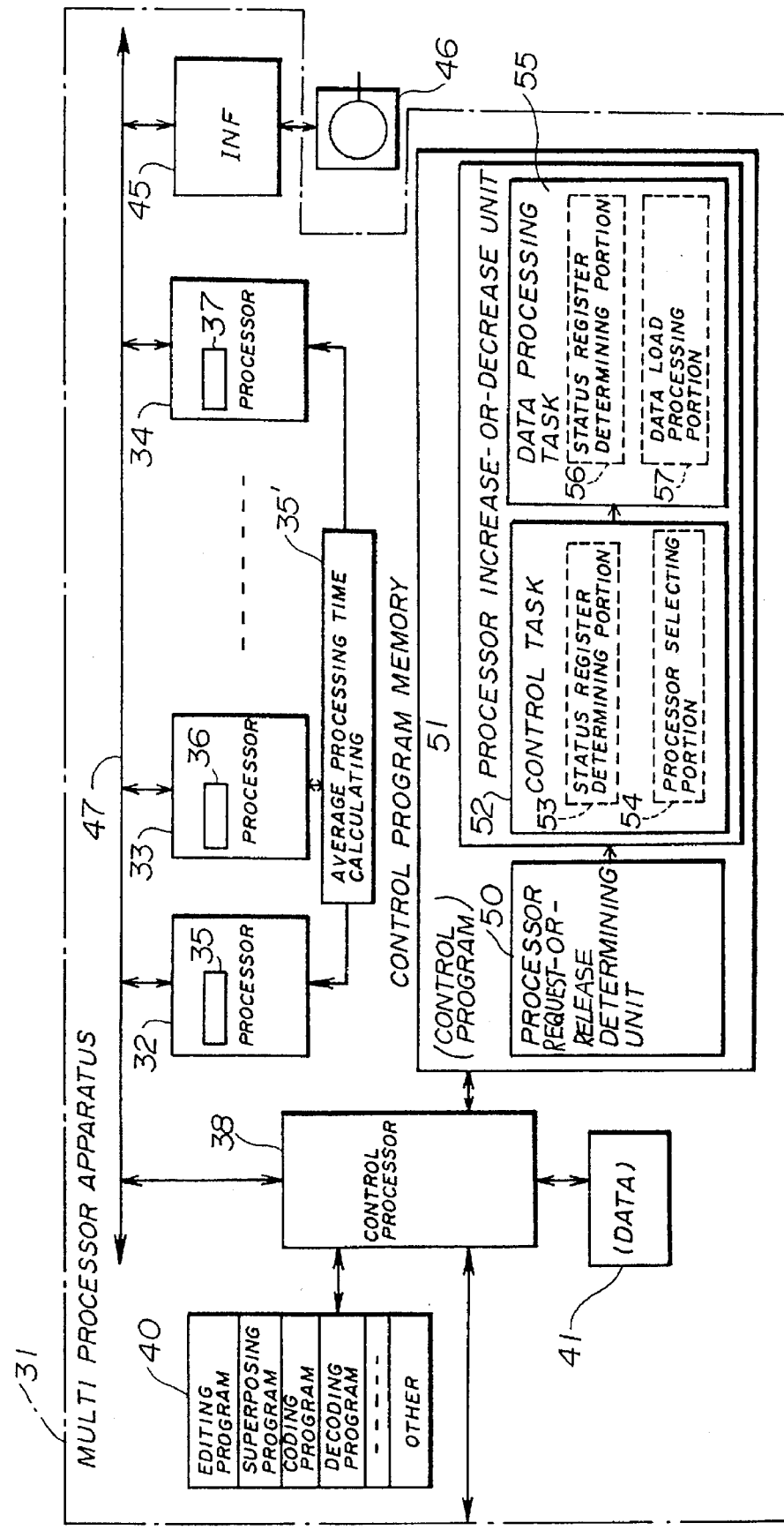

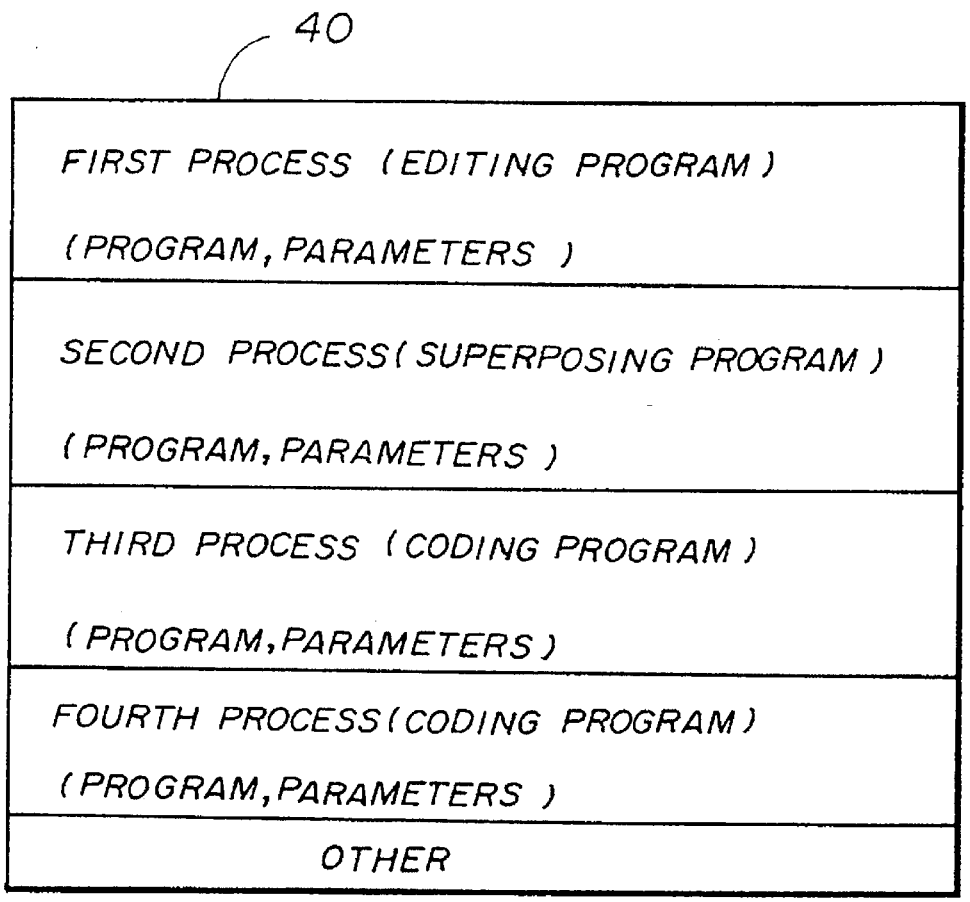

| 70 | |
|---|---|
| 0, 0 | (Not Ready) |
| 0, 1 | PROGRAM IS NOT LOADED OUT OF OPERATION (Ready) |
| 1, 0 | PROGRAM IS LOADED BEFOR PROCESSING (Idle) |
| 1, 1 | PROCESSING (Busy) |

| 71 | |
|---|---|
| 1 | FIRST PROCESS |
| 2 | SECOND PROCESS |
| ⋮ | ⋮ |
| n | n-th PROCESS |

$m_{AV}$ (72)

CONTROL SYSTEM FOR MULTI-PROCESSOR APPARATUS

This is a continuation of application Ser. No. 08/272,263, filed Jul. 8, 1994 now abandoned.

BACKGROUND OF THE INVENTION

(1) Field of the Invention

The present invention generally relates to a control system for a multi-processor apparatus, and more particularly to a control system for controlling assignment of processes to processors in a multi-processor apparatus.

A facsimile machine in which processes, such as an editing process, a coding process and a decoding process, of document data including image data and text data are performed has a plurality of processors each of which carries out one of the processes.

The present invention provides a control system for controlling a multi-processor apparatus having a plurality of processors to use the processors so that the processes are efficiently executed.

(2) Description of the Related Art

A conventional multi-processor apparatus, such as the above facsimile machine, has, for example, special-purpose processors for a document editing process, an image superposing process, a coding process and a decoding process.

FIGS. 1A and 1B show examples of processes executed in the multi-processor apparatus, which processes are an editing process for performing enlargement conversion of a document and a superposing process for superposing graphics on document data.

In FIG. 1A, a process of the enlargement conversion of documents is illustrated. Referring to FIG. 1A, an A4 sized document data 101 is converted into a B4 sized document data 102 (enlarged document data). In this enlargement conversion process, both the character data and image data of original document data are enlarged, so that the enlarged document data is obtained.

In FIG. 1B, the superposing process for graphics is illustrated. Referring to FIG. 1B, a document 104 includes character data and has a blank space 104' over which graphics represented by image data 103 is to be superposed. The graphics represented by the image data 103 is superposed on the blank space 104' in the document 104, so that a document 105 including the character data and graphics 105' is obtained. In this superposing process, the character data is arranged so that the blank space 104' is formed in the document 104, and the image data 103 of the graphics is embedded in the blank space 104'.

FIG. 2 shows a structure of the conventional multi-processor apparatus.

Referring to FIG. 2, the multi-processor apparatus has an editing processor 110, a superposing processor 111, a coding processor 112, a decoding processor 113, an input-output control processor 114, a data memory 121, a program memory 122 all of which are coupled to each other by a bus 133. The editing processor 110 performs a process for editing document data. The superposing processor 111 performs a process for superposing image data on document data. The coding processor 112 codes data to obtain compressed data. The decoding processor 113 decodes the compressed data. The input-output control processor 114 performs an input-output control of data. The data memory 121 stores data used in this apparatus. The program memory 122 stores input-output control programs. This multi-processor apparatus has also an input unit 130, an output unit 131 and an input-output interface 132, the input unit 130 and the output unit 131 being coupled to the bus 133 via the input-output interface 132. The input unit 130 has a keyboard for inputting data and other devices for inputting received data from an external disc unit and a transmission line. The output unit 131 has a display device for displaying data, a printer for printing data and other devices for outputting transmission data to the transmission line.

The above multi-processor apparatus operates as follows.

Document editing data and image data input by the input unit 130 are supplied to the bus 133 via the input-output interface 132. The document editing data and image data are stored in the data memory 121 under the control of the input-output control processor 114. In the document editing process, the editing processor 110 processes the input data in accordance with an editing program. In a case where images are superposed on a document, the superposing processor 111 processes document data and image data in accordance with a superposing program so that the images are superposed on the document.

If the input data is compressed data, the decoding processor 113 decodes the compressed data in accordance with a decoding program. The data processed by the respective processors is stored in the data memory 121. In a case where data in a document obtained by the processes is compressed and transmitted, the data, (including document data and image data) of the document, to be transmitted is compressed in accordance with a coding program, and the compressed data is supplied to the output unit 131 via the input-output interface 132.

In the conventional multi-processor apparatus, each of the processors is a special-purpose processor for a process. Thus, if an amount of data in a process assigned to a processor increases, a waiting time for the process to be executed by the processor increases. On the other hand, a processor to which a process having a small amount of data is assigned has a long idle time. Thus, in the conventional multi-processor apparatus, the utilization of the processors is low.

SUMMARY OF THE INVENTION

Accordingly, a general object of the present invention is to provide a novel and useful control system of a multi-processor apparatus in which the disadvantages of the aforementioned prior art are eliminated.

A more specific object of the present invention is to provide a control system by which processors in a multi-processor apparatus are efficiently used so that even if an amount of data in a process assigned to a processor increases, the process can be completed in a short time as possible.

The above objects of the present invention are achieved by a control system for a multi-processor apparatus having a plurality of processors in which each of the plurality of processors are assigned to a process, the control system comprising: determining means for determining whether or not an excess processor for the process is included in processors assigned to the process; and releasing means for, when the determining means determines that an excess processor for the process is included in the processors assigned to the process, releasing the excess processor from the process.

According to the present invention, since the excess processor is released from the process, the excess processor can be assigned to another process. As a result the other process can be completed in as short a time as possible.

The above objects of the present invention are also achieved by a control system for a multi-processor apparatus having a plurality of processors in which each of the plurality of processors are assigned to a process, the control system comprising: first determining means for determining whether or not a number of processors assigned to the process is insufficient; second determining means for determining whether or not a processor which is not busy is included in the plurality of processors; and adding means for, when the first determining means determines that the number of processors assigned to the process is insufficient and when the second determining means determines that a processor which is not busy is included in the plurality of processors, adding the processor which is not busy to processors assigned to the process.

According to the present invention, since the processor which is not busy is added to the processors assigned to the process, the process can be completed in as short a time as possible.

The above objects of the present invention are also achieved by a control system for a multi-processor apparatus having a plurality of processors in which each of the plurality of processors are assigned to a process, the control system comprising: first determining means for determining whether or not a number of processors assigned to a first process is insufficient; second determining means for determining whether or not an excess processor for a second process is included in processors assigned to the second process; releasing means for, when the second determining means determines that an excess processor for the second process is included in the processors assigned to the second process, releasing the excess processor from the second process; and adding means for, when the first determining means determines that the number of processors assigned to the process is insufficient, adding the excess processor released from the second process by the releasing means to the processors assigned to the first process.

According to the present invention, since a processor is released as the excess processor from the second process is added to the processors assigned to the first process, the first process can be completed in as short a time as possible. That is, a larger number of processors can be always assigned to a process having a larger amount of data to be processed.

Additional objects, features and advantages of the present invention will become apparent from the following detailed description when read in conjunction with the accompanying drawings.

BRIEF DESCRIPTION OF THE DRAWINGS

FIG. 5 is a block diagram illustrating a multi-processing apparatus including a control system according to an embodiment of the present invention.

FIG. 6A is a diagram illustrating a program memory included in the multi-processor apparatus shown in FIG. 5.

FIG. 6B is a diagram illustrating a status register included in the multi-processor apparatus shown in FIG. 5.

DESCRIPTION OF THE PREFERRED EMBODIMENTS

A description will now be given, with reference to FIGS. 3, 4A and 4B, of the principle of the present invention.

Figure 1A:
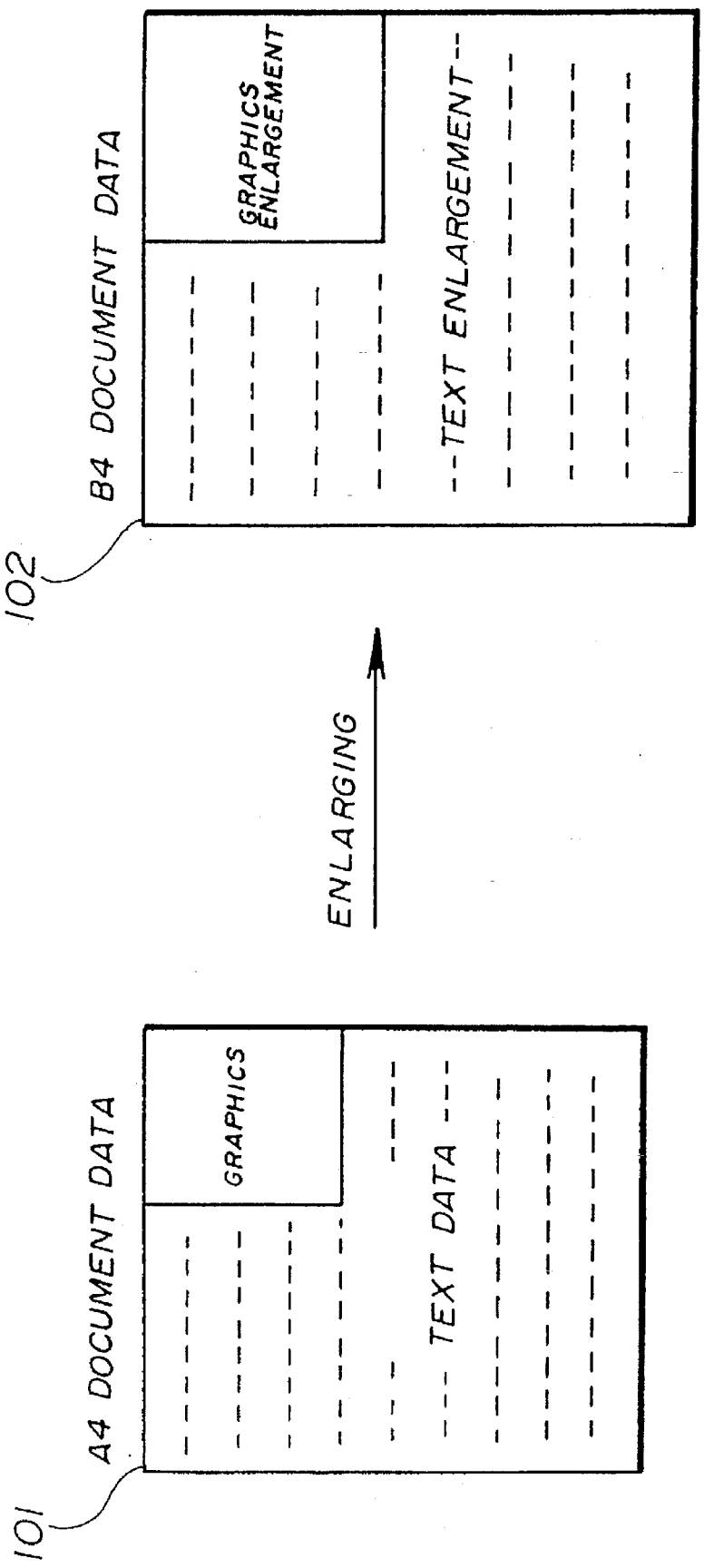
FIGS. 1A and 1B are diagrams illustrating examples of processes executed in the multi-processor apparatus.
Figure 1B:
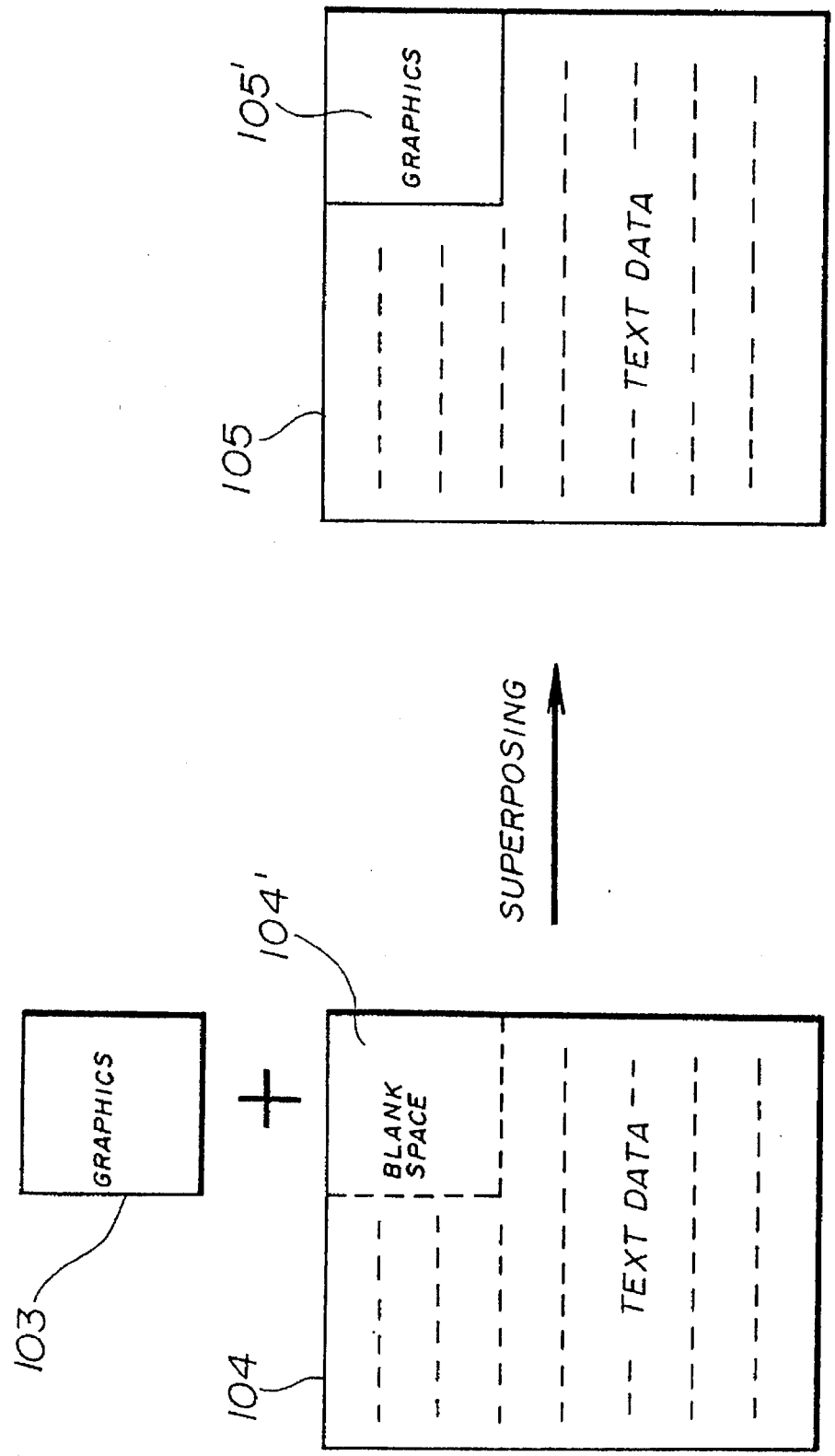
Figure 2:
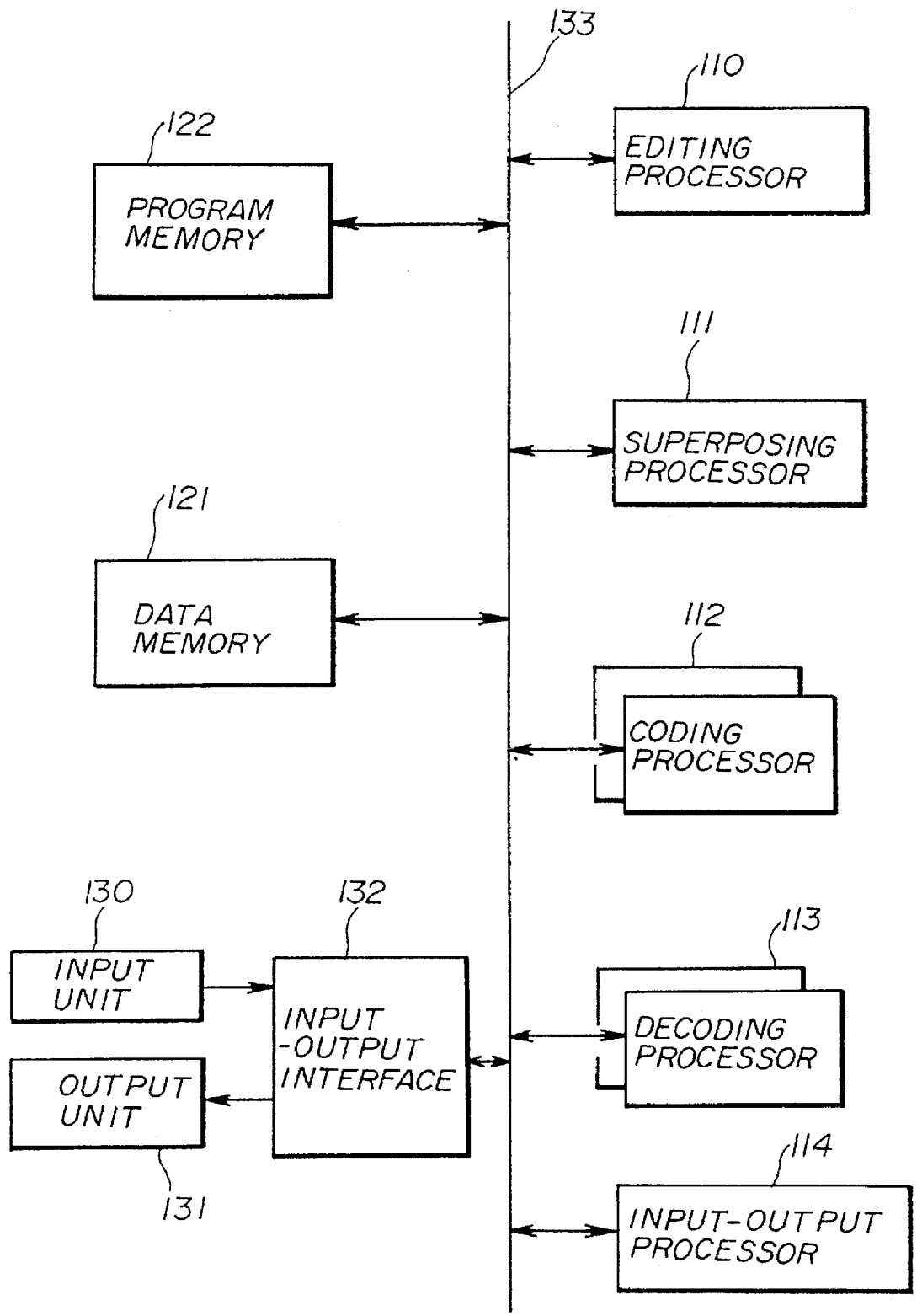
FIG. 2 is a block diagram illustrating a structure of a conventional multi-processor apparatus.
Figure 3:
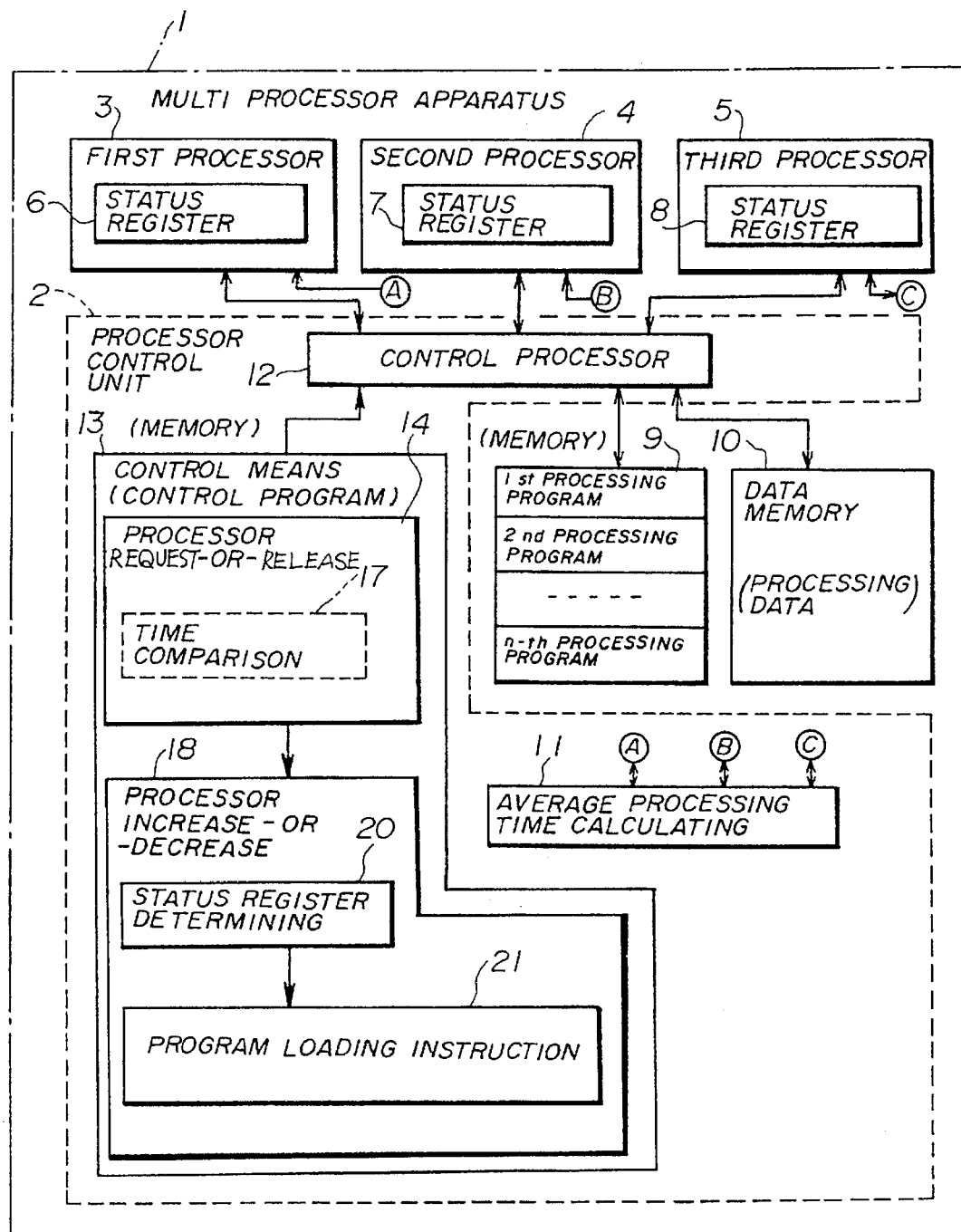
FIG. 3 is a block diagram illustrating the principle of a multi-processing processor apparatus according to the present invention.

FIG. 3 shows an essential structure of a multi-processing apparatus according to the present invention. Referring to FIG. 3, a multi-processor apparatus 1 has a processor control unit 2, a first processor 3, a second processor 4, a third processor 5, a program memory 9 and a data memory 10. The first, second and third processors 3, 4 and 5 respectively have status registers 6, 7 and 8 for storing values representing states of the respective first, second and third processors 3, 4 and 5. The program memory 9 stores a 1st processing program, a 2nd processing program, . . . and an n-th processing program. The data memory 10 stores data processed in the multi-processor apparatus 1.

The processor control unit 2 has average processing time calculating means 11, a control processor 12 and control means 13. The processor control unit 2 assigns the first, second and third processors to processes to be performed in parallel in accordance with processing programs. The average processing time calculating means 11 calculates an average processing time in each of the first, second and third processors 3, 4 and 5. The average processing time in each of the first, second and third processors 3, 4 and 5 is stored in a corresponding one of the status registers 6, 7 and 8. The processor control unit 2 supplies a predetermined amount of data to each of the first, second and third processors 3, 4 and 5 to execute an assigned processing program every time the process for the data is completed. The average processing time is an average of processing time for which the predetermined amount of data (a unit amount of data) supplied to each of the processors 3, 4 and 5 is processed in accordance with a processing program. The control processor 12 controls the first, second and third processors 3, 4 and 5. The control means 13 corresponds to control programs stored in a memory. The control means 13 determines whether the number of processors executing a processing program for a single process should increase or can decrease. In accordance with the determination result, the number of processors executing the processing program for the process is increased or decreased.

The control means 13 (the control programs) has processor request-or-release determining means 14 and processor increase-or-decrease means 18. The processor request-or-release determining means 14 has time comparison means 17. In the processor request-or-release determining means 14, an average processing time of a processing program for a current process is compared with an average non-processing time, and it is determined, based on the comparison result, whether the number of processors assigned to the process can be decreased. The non-processing time is a total time for which one or a plurality of processors assigned to a current process is (or are) in an idle state before the current process is completed. In addition, the average processing time of the processing program for the current process is compared with a waiting time, and it is determined, based on the comparison result, whether or not the number of processors assigned to the process should be increased. The waiting time is a time for which the last data for a current process waits to be processed by a processor assigned to the current process.

The processor increase-or-decrease unit 18 has a status register determining means 20 and program loading instruction means 21. If the processor increase-or-decrease unit 18 receives a request for increasing the number of processors from the processor request-or-release determining unit 14, the processor increase-or-decrease unit 18 selects, with reference to information in the status registers 6, 7 and 8, a processor which can be additionally used for the process (not busy, for example, in an idle state or a ready state). The processing is load for the process is loaded into the additional processor. If the processor increase-or-decrease unit 18 receives a request for decreasing the number of processors from the processor request-or-release determining unit 14, the processor increase-or-decrease unit 18, with reference to the information in the status registers 6, 7 and 8, determines whether or not a processor is in a state where the processor can be released from a processing program (the current process). If so, the processor is, as an excess processor for the current process, released from the processing program (the current process). If another processing program should be loaded into a processor, the other processing program is loaded into the above processor which has been released from the current process.

Figure 4A:
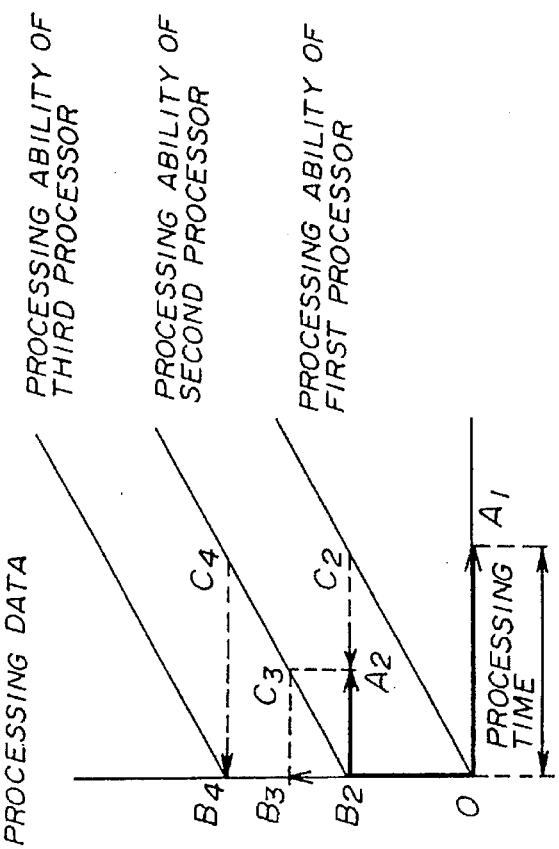
FIGS. 4A and 4B are graphs illustrating the principle of controlling of processors in the multi-processor apparatus.
Figure 4B:
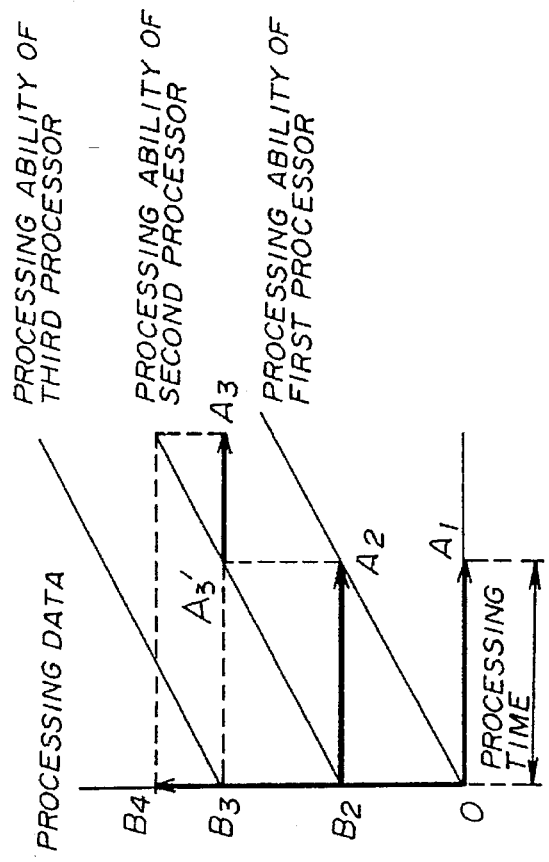

FIGS. 4A and 4B shows a determination method for determining a number of processors needed for an amount of data which has not been processed yet.

FIG. 4A shows a relationship between an amount of data which can be processed by two processors and the average processing time. FIG. 4B shows a relationship between an amount of data which is to be processed by two processors and a processing time of the processors. In FIGS. 4A and 4B, the axis of abscissas represents the average processing time and the axis of ordinates represents an average amount of input data (an amount of data to be processed).

In FIG. 4A, OA1 represents an average processing time for a unit amount of processing data (an average processing time for the unit amount of data which has been processed already). OB3 represents an amount of data to be processed in a current process. OB2 represents an amount of data (the unit amount of data) processed by the first processor 3. B2B3 represents an amount of data processed by the second processor 4. Thus, in a case where an amount of data to be processed is equal to OB3, the data can be processed by two processors. A2C2 represents the non-processing time. That is, the second processor 4 is in the idle state for a time A2C2 before the current process is completed.

In FIG. 4B, OB4 represents an amount of data to be processed in a current process. OA1 represents an average processing time for the unit amount of data. OB2 represents an amount of data (the unit amount of data) processed by the first processor 3. B2B3 represents an amount of data (the unit amount of data) processed by the second processor 4. B3B4 represents an amount of data which has been not yet processed. A processing time required to completely process the amount of data B3B4 is represented by B3A3 (B2A2(= OA1)+A3'A3). Thus, if the amount of data represented by OB4 is processed by two processors 3 and 4, the processing time exceeds the average processing time (OA1=B2A2). Thus, to process the data within the average processing time, three processors are needed. That is, in a case where the amount of data OB4 should be processed, it is necessary to add one processor assigned to the current process. In this case, the waiting time is equal to the average processing time (OA1, B2A2).

The system shown in FIG. 3 operates as follows.

The first processor 3 and the second processor 4 currently execute a first processing program.

In a case where the first processing program is executed, an initial number of processors to be assigned to a process corresponding to the first processing program is calculated based on an amount of data which is estimated. The initial number of processors are selected. The first processing program is loaded, for example, into the first processor 3 and the second processor 4, and the process starts when data is supplied to the first and second processors 3 and 4. After this, every time the unit amount of data is supplied to the first and second processors 3 and 4, the data is processed in accordance with the first processing program.

The average processing time calculating means 11 calculates average processing times in the first and second processors 3 and 4. The average processing times are respectively stored in the status registers 6 and 7. The average processing time in each processor is updated every time the unit amount of data is completely processed.

When new data to be processed are supplied to the system, a processing time for the new data is compared with the average processing time by the time comparison means 17. If it is determined, based on the comparison result obtained by the comparison means 17, that the processing time exceeds the average processing time, that is, that the waiting time for the process is equal to or greater than the average processing time, the processor request-or-release determining means 14 requests the processor increase-or-decrease means 18 to increase the number of processors which should execute the first processing program. On the other hand, when an average of the non-processing time is equal to or greater than the average processing time, it is determined that the number of processors can be decreased. In this case, the processor request-or-release determining means 14 requests the processor increase-or-decrease means 18 to decrease the number of processors executing the first processing program.

When the processor increase-or-decrease means 18 receives from the processor request-or-release determining means 14 the request to increase the number of processors for the data processed in accordance with the first processing program, the processor increase-or-decrease means 18 refers to the value stored in the status register 8 of the third processor 5. If the processor increase-or-decrease means 18 determines, based on the value in the status register 8, that the third processor 5 is in a state (e.g. the idle state or a ready state) where the first processing program can be loaded therein (the third processor 5 is not busy), the processor increase-or-decrease means 18 instructs the third processor 5 to carry out the process in accordance with the first processing program.

On the other hand, when the processor increase-or-decrease means 18 receives from the processor request-or-release determining means 14 the request to decrease the number of processors for the data processed in accordance with the first processing program, the processor increase-or-decrease means 18 refers to the values in the status registers 6 and 7 of the first and second processors 3 and 4. If it is determined, based on the values in the status registers 6 and 7, that one of the processors is in a state (e.g. the idle state or the ready state) where the first processing program can be released from the processor, one of the processors is released from the process in accordance with the first processing program.

If it is necessary to load another processing program such as the second processing program into the processor which has been released from the process in accordance with the first processing program, the other processing program is loaded into the processor and the process is carried out in accordance with the other processing program.

In the above case, the processor request-or-release determining means 14 may request to increase the number of processors when a waiting time from receiving new data to be processed until starting to process the new data exceeds the average processing time.

A description will now be given of an embodiment of the present invention.

FIG. 5 shows an multi-processor apparatus according to an embodiment of the present invention.

Referring to FIG. 5, a multi-processor apparatus 31 has a 1st processor 32, a 2nd processor 33, . . . , and an n-th processor 34, a control processor 38, a program memory 40, a data memory 41, a control program memory 42 and an external memory interface 45. The processors 32, 33, 34, the control processor 38 and the external memory interface 45 are coupled to each other by a system bus 47.

The processors 32, 33 and 34 respectively has status registers 35, 36 and 37. The program memory 40 stores an editing program, a superposing program, a coding program, a decoding program and other processing programs. The control program memory 42 stores control programs. The external memory interface 45 are coupled to an external memory 46 so that data is transmitted from the external memory 46 to the system bus 47 via the external memory interface 45 and vice versa. The external memory 46 is a storage device such as a disc unit, and stores coding and decoding programs other than those stored in the program memory 40 and other programs.

The control program memory 42 is provided with a processor request-or-release determining unit 50 and a processor increase-or-decrease unit 51 both of which are formed of control programs. The processor increase-or-decrease unit 51 has a control task block 52 and a data processing task block 55. The control task block 52 has a status register determining portion 53 and a processor selecting portion 54, and refers to information in the status registers in response to a request, from the processor request-or-release determining unit 50, to increase or decrease the number of processors. Based on the result of reference to the information in the status registers, the control task block 52 selects a processor to be released from the process or to be added. The data processing task block 55 has a status register determining portion 56 and a data load processing portion 57, and controls a processor selected by the control task block 52 so that the selected processor carries out the data processing.

The program memory 40 is formed as shown in FIG. 6A. Referring to FIG. 6A, the program memory 40 stores a first processing program (1) (the editing program), a second processing program (2) (the superposing program), a third processing program (3) (the coding program), a fourth processing program (4) (the decoding program), and other programs. Each of the programs is formed of programing description and parameters representing the contents of a process (corresponding to one of the editing program, the superposing program and the like).

Each of the status registers 35, 36 and 37 is formed as shown in FIG. 6B. FIG. 6B shows only a structure of the status register 35, but other status registers 36 and 37 have the same structure as that shown in FIG. 6B. Referring to FIG. 6B, the status register 35 is divided into three setting portions 70, 71 and 72. The first portion 70 stores a value of a processing state which will be described later. The second portion 71 stores a value representing a process corresponding to one of the first program (1) (the editing program), the second program (2) (the superposing program) and other programs. The third portion 72 stores the average processing which is an average of the processing time of a corresponding processor.

Figures 7A, 7B, 7C:
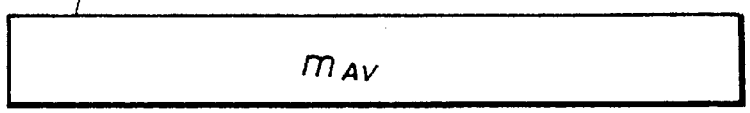
FIGS. 7A, 7B and 7C are diagrams illustrating values stored in the status register shown in FIG. 6B.

The values stored in each of the status registers 35, 36 and 37 are shown in FIGS. 7A, 7B and 7C.

FIG. 7A shows values which can be stored in the first portion 70 of each of the status registers. Referring to FIG. 7A, a value "00" indicates a state where the processor is not used (in a not-ready state). A value "01" indicates a state where a processing program is not loaded in the processor and the processor is out of operation (in the ready state). A value "10" indicates a state where a processing program has been loaded in the processor but the processor does not execute the processing program (in the idle state). A value "11" indicates a state where a processing program has been loaded in the processor and the processor is executing the processing program (in the busy state). The second portion 71 stores values indicating contents of processes. A value "1" indicates a first process (corresponding, for example, to the editing program). A value "2" indicates a second process (corresponding, for example, to the superposing program). A value "n" indicates a process corresponding to the n-th processing program. The third portion 72 stores a value $m_{AV}$ of the average processing time.

Figure 8:
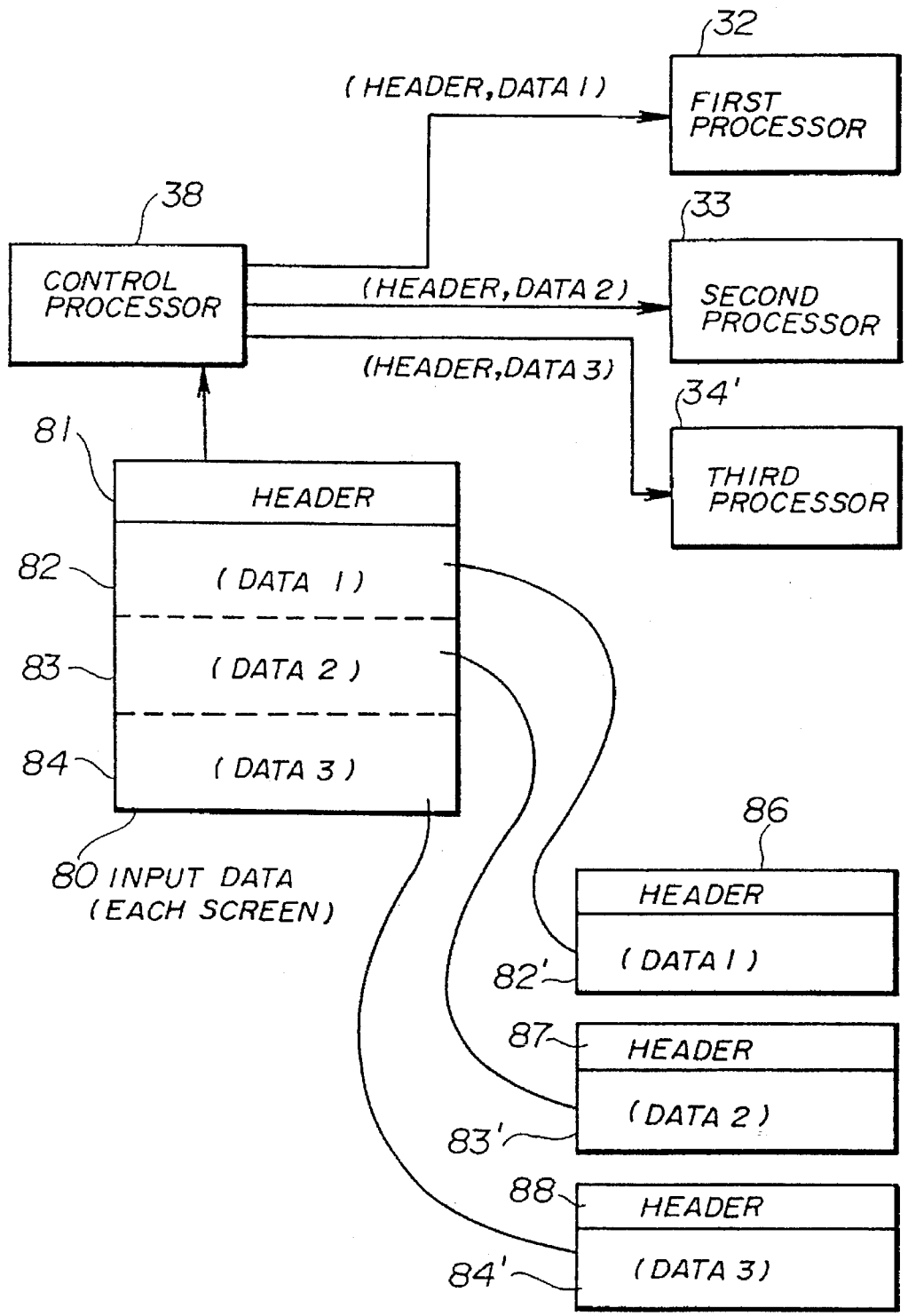
FIG. 8 is a block diagram illustrating data processed in this system.

The data is processed in the system as shown in FIG. 8.

Referring to FIG. 8, the control processor 38 controls the first processor 32, the second processor 33 and the third processor 34' using input data 80 stored in the data memory 41. The input data 80 is formed of a header 81 and data for each screen. The data for each screen is divided into first data 82, second data 83 and third data 84. The first, second and third data 82, 83 and 84 are provided with headers and are respectively processed by the first, second and third processors 32, 33 and 34'. The header 81 of the input data 80 is formed of information indicating a type of data, a data length and the contents of a process. The type of data represents text data (characters), image data or the like.

In FIG. 8, the input data is processed by the first, second and third processors 32, 33 and 34'. The input data 80 is divided into the first, second and third data 82, 83 and 84, and the first, second and third data 82, 83 and 84 are respectively provided with header 86, 87 and 88. As a result, data 82', data 83' and data 84' are generated. The data 82', 83' and 84' are processed by the first, second and third processors 32, 33 and 34'.

Figure 9:
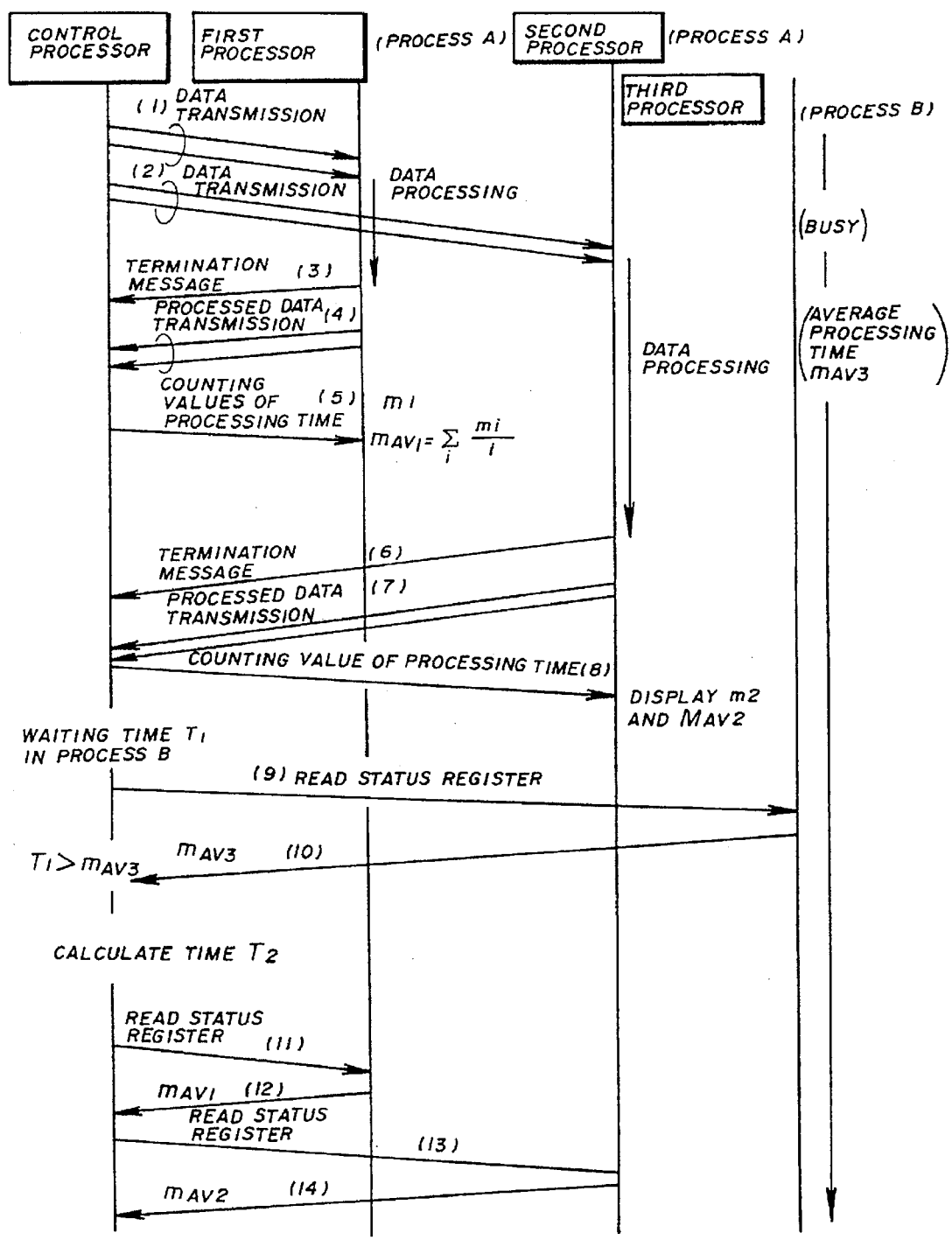
FIG. 9 is a flow chart illustrating controlling of processors in the multi-processor apparatus.
Figure 10:
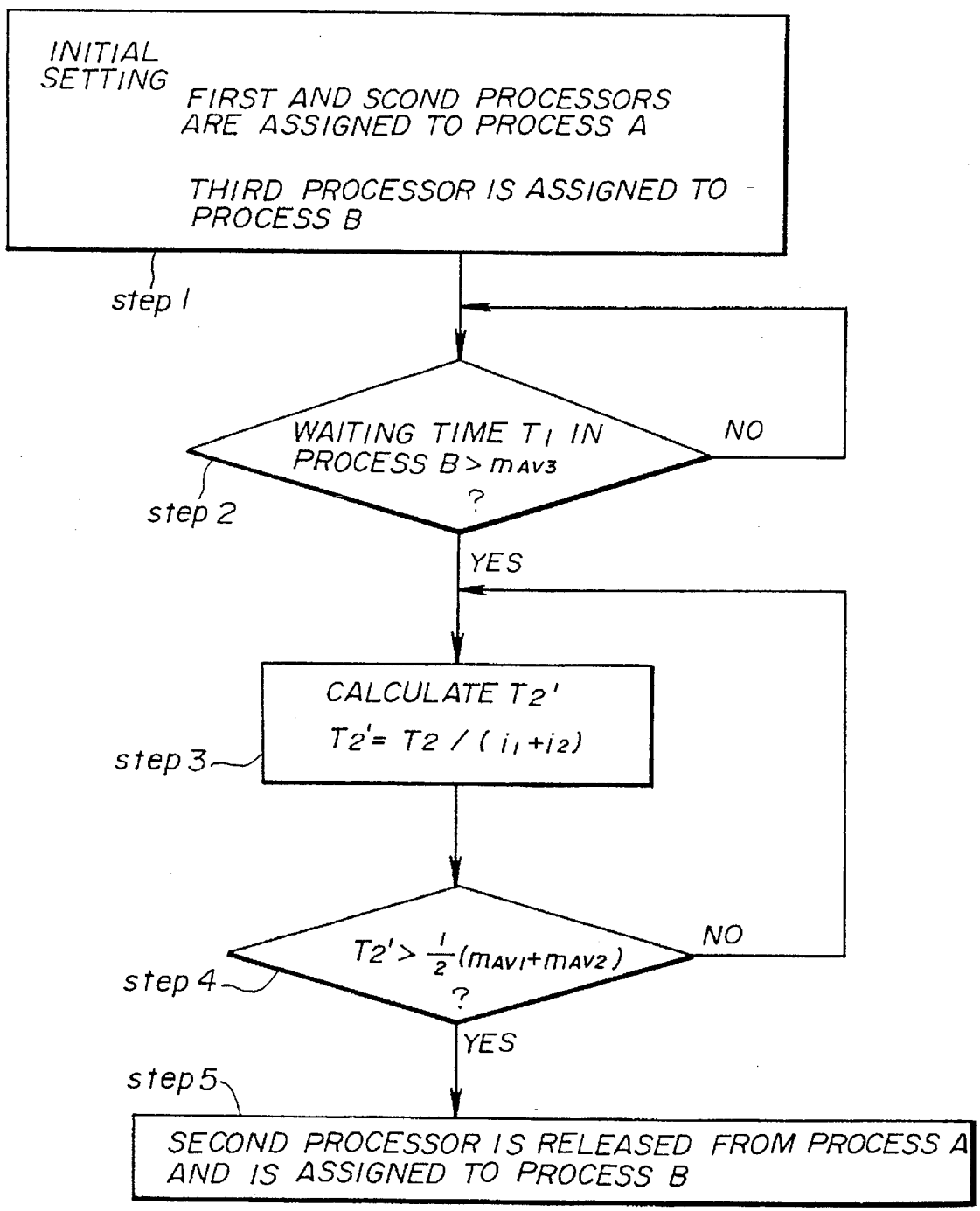
FIG. 10 is a flow chart illustrating operations of a control processor.

The process executed by the processor request-or-release determining means 14 is shown in FIGS. 9 and 10.

In FIGS. 9 and 10, first, second and third processors are activated in the multi-processing apparatus. The first and second processors carry out a process A and the third processor carries out a process B. The control processor 38 operates in accordance with the flow chart shown in FIG. 10.

In step 1 shown in FIG. 10, the control processor 38 initially assigns the process A to both the first and second processors and the process B to the third processor.

In FIG. 9, the processing data is transmitted from the control processor 38 to the first and second processors 32 and 33 ((1) and (2)). When the first processor 32 completely processes the data in the process A, the first processor 32 informs the control processor 38 of the termination of the process (3), and the processed data is transmitted from the first processor 32 to the control processor 38 (4). The control processor 38 has started a counting operation from starting of the processing. When the control processor 38 receives the processed data, a count value $m_1$ at this time is transmitted to the first processor 32 (5). The average processing time calculation unit 35' calculates an average processing time $m_{AV1}$ of the first processor 32 using the count value $m_i$ in accordance with the following equation;

$$m_{AV1} = \Sigma m_i/i$$

where i is a number of repetitions of the process. When the second processor 33 completely processes the data in the process A, the second processor 33 informs the control processor 38 of the termination of the process (6), and the processed data is transmitted from the second processor 33 to the control processor 38 (7). After this, the control processor 38 transmits a count value $m_2$ to the second processor 33. An average processing time $m_{AV2}$ of the second processor 33 is calculated by the average processing time calculation unit 35' using the count value $m_2$ in the same manner as that of the first processor 32 (8).

The third processor 34' is carrying out the process B and is in the busy state. Thus, the value corresponding to the busy state is stored in the status register of the third processor 34'.

In this state, if a waiting time T1 occurs in the process B, the control processor 38 reads a value from the status register of the third processor 34' (9). The control processor 38 determines, based on the value in the status register, that the third processor 33 is in the busy state. It is then determined whether or not the waiting time T1 is greater than the average processing time $m_{AV3}$ in step 2 shown in FIG. 10. If the waiting time T1 exceeds the average processing time $m_{AV3}$ of the third processor 33 ($T1 > m_{AV3}$), the control processor 38 determines that the number of processors for the process B should increase (10).

After this, the control processor 38 reads a value from the status register 35 of the first processor 32 (11), so that the control processor 38 obtains the average processing time $m_{AV1}$ of the first processor 32 (12). The control processor 38 then reads a value from the status register 36 of the second processor 33 (13), so that the control processor 38 obtains the average processing time $m_{AV2}$ of the second processor 33 (14).

The control processor 38 adds an idle or ready time of the first processor 32 and an idle or ready time of the second processor 33 and obtains a time T2. The time T2 is divided by (i1+i2) and an average time T2' is obtained in step 3 shown in FIG. 10, where i1 is a number of repetitions of processes in the first processor 32 and i2 is a number of repetitions of processes in the second processor 33. It is determined, in step 4 shown in FIG. 10 whether or not T2/(i1+i2) is greater than $(m_{AV1}+m_{AV2})/2$. A case where T2/(i1+i2) > $(m_{AV1}+m_{AV2})/2$ means that the first and second processors 32 and 33 have time to spare. Thus, in this case, the control processor 38 determines that at least one of the first and second processors 32 and 33 should carry out the process B. For example, the process to which the second processor 33 should be assigned is changed from the process A to the process B in step 5 shown in FIG. 10.

Figure 11:
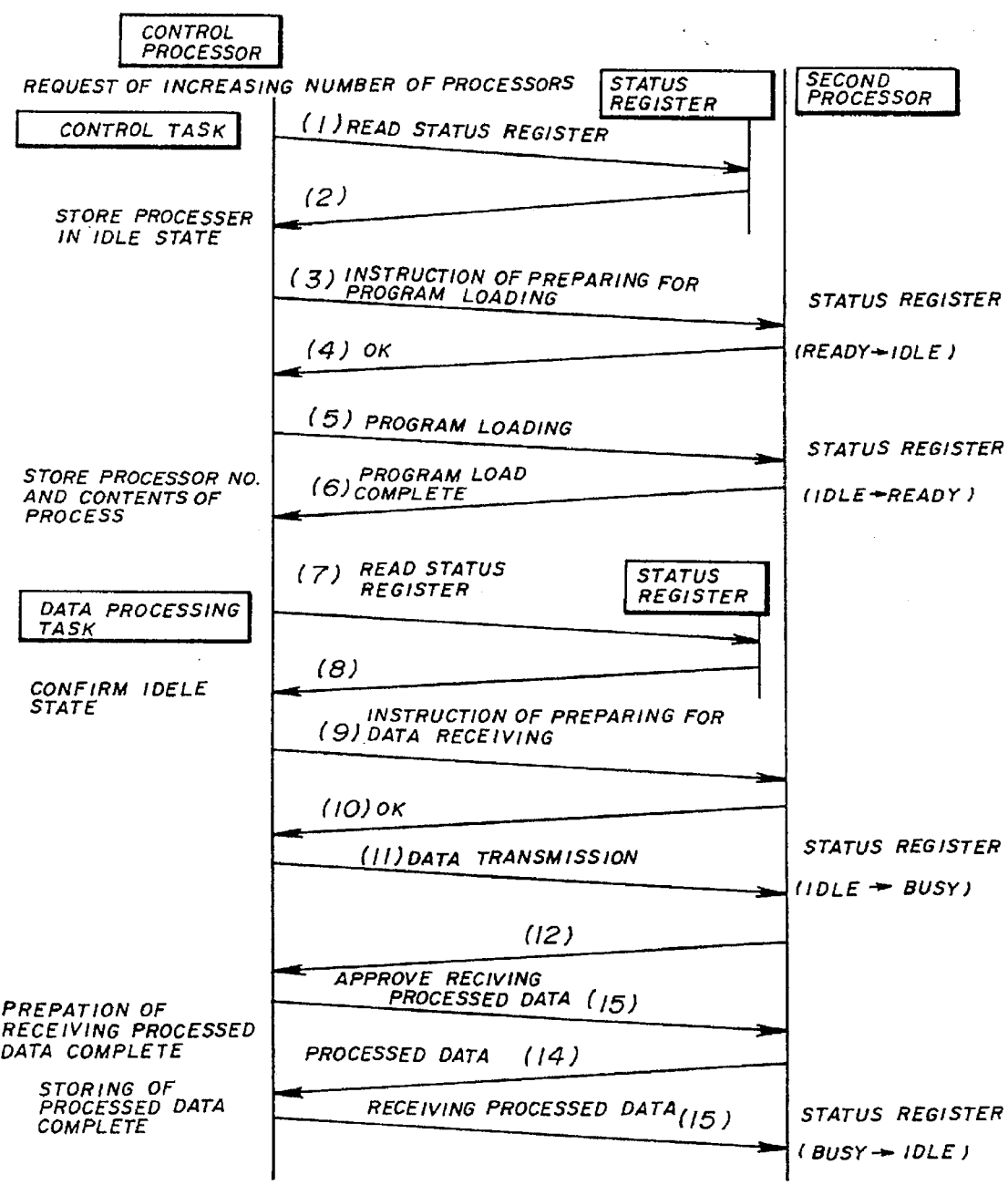
FIG. 11 is a flow chart illustrating a process in a processor increase-or-decrease unit.

FIG. 11 shows the processor increase-decrease unit 18. After the request to increase the number of processors assigned to the process B occurs, the processing program shown in FIG. 11 is executed.

Referring to FIG. 11, steps (1)–(6) are carried out between the control task block 52 and the status register of the processor, and steps (7)–(15) are carried out between the data processing task 55 and the status register of the processor.

The process B (e.g. the editing program) is loaded into the third processor 34, the process B is executed by the third processor 34. The control task block 52 receives from the processor request-or-release determining unit 14 shown in FIGS. 9 and 10 the request to increase the number of processors for the process B. Here, it is assumed that the second processor 33 is added for the process B.

The status register determining portion 53 of the control task 52 reads values from the status registers 35 and 36 of the first and second processors 32 and 33 (1). The status register determination portion 53 stores the identity of a processor which is in the idle state (2). If the second processor 33 is in the idle state, the processor selecting portion 54 instructs the second processor 33 to carry out preparation of program loading (3). The second processor 33 responds to the instruction of the program loading (4). The control task block 52 controls the second processor 33 so that the process B is loaded into the second processor 33 (5). The second processor 33 transmits to the control task block 52 a response representing that the program loading has been completed (6). The control task block 52 stores information regarding the added processor and the process.

Next, the process is performed in the data processing task block 55.

The data processing task block 55 reads a value from the status register 36 of the second processor 33 (7). The data processing task block 55 recognizes that the second processor 33 is in the idle state (8). When the data processing task 55 recognizes that the second processor 33 is in the idle state, the data processing task 55 instructs the second processor 33 to carry out the preparation of the data receiving (9). The second processor 33 responds to the instruction from the data processing task block 55 (10). The data processing task block 55 transmits the data to the second processor 33 (11). When the second processor 33 receives the data, the value in the status register of the second processor 33 is changed from the idle state to the busy state (12). The data is processed by the second processor 33. When the data is completely processed, the second processor 33 informs the data processing task block 55 of the termination of the process. The control processor 38 informs the second processor 33 that the processed data can be received by the control processor 38 (13). After this, the second processor 33 transmits the processed data to the control processor 38 (14). The control processor 38 informs the second processor 33 of receiving the processed data (15). The value in the status register 36 of the second processor 33 is changed from the busy state to the idle state.

Operations of the third processor 34' initially assigned to the process B is omitted from the FIG. 11.

The present invention is not limited to the aforementioned embodiments, and variations and modifications may be made without departing from the scope of the claimed invention.

What is claimed is:

1. A control system for a multiprocessor apparatus having a plurality of processors in which said plurality of processors are assigned to processes, said control system comprising:

determining means for determining, based on a total time for which processors assigned to a process are in an idle state before the process is completed, whether or not an excess processor for the process is included in the processors assigned to the process; and releasing means for, when said determining means determines that an excess processor for the process is included in the processors assigned to the process, releasing the excess processor from the process, wherein said determining means comprises:
- calculating means for calculating an average processing time for which each processor processes a predetermined amound data in the process; and
- comparing means for comparing a non-processing time and the average processing time to each other, the non-processing time being a total time for which processors assigned to the process in an idle state before the process is completed, wherein when the non-processing time is equal to or greater than the average processing time, said determining means determines that at least one excess processor is included in the processors assigned to the process.

2. The control system as claimed in claim 1, wherein the average processing time is updated every time each processor completely processes the predetermined amount of data in the process.

3. A control system for a multi-processor apparatus having a plurality of processors in which each of said plurality of processors are assigned to a process, said control system comprising:
- first determining means for determining whether or not a number of processors assigned to the process is insufficient;
- second determining means for determining whether or not a processor which is not busy is included in said plurality of processors; and
- adding means for, when said first determining means determines that the number of processors assigned to the process is insufficient and when said second determining means determines that a processor which is not busy is included in said plurality of processors, adding the processor which is not busy to processors assigned to the process, wherein said first determining means comprises:
- calculating means for calculating an average processing time for which each processor processes a predetermined amount of data in the process; and
- comparing means for comparing a waiting time and the average processing time to each other, the waiting time being a time for which data for the process waits to be processed by one of the processors assigned to the process, wherein when the waiting time is equal to or greater than the average processing time, said determining means determines that the number of processors assigned to the process is insufficient.

4. The control system as claimed in claim 3, wherein when data supplied to a processor assigned to the process waits to be processed by the processor, said first determining means determines that the number of processors assigned to the process is insufficient.

5. The control system as claimed in claim 3, wherein the average processing time is updated every time each processor completely processes the predetermined amount of data in the process.

6. A control system for a multi-processor apparatus having a plurality of processors in which said plurality of processors are assigned to processes, said control system comprising:
- first determining means for determining whether or not a number of processors assigned to a first process is insufficient;
- second determining means for determining, based on a total time for which processors are assigned to a second process are in an idle state before the second process is completed, whether or not an excess processor for the second process is included in the processors assigned to the second process when said first determining means determines that the number of processors assigned to the first process is insufficient;
- releasing means for, when said second determining means determines that an excess processor for the second process is included in the processors assigned to the second process, releasing the excess processor from the second process; and
- adding means for adding the excess processor released from the second process by said releasing means to the processors assigned to the first process.

7. The control system as claimed in claim 6, wherein said second determining means determines a processor which is in the idle state before the second process is completed as the excess processor.

8. The control system as claimed in claim 6, wherein said second determining means comprises:
- calculating means for calculating an average processing time for which each processor processes a predetermined amount of data in the first process; and
- comparing means for comparing a non-processing time and the average processing time to each other, the non-processing time being a total time for which one or a plurality of processors assigned to the second process is (or are) in an idle state before the second process is completed, wherein when the non-process time is equal to or greater than the average processing time, said second determining means determines that at least one excess processor is included in the processors assigned to the second process.

9. The control system as claimed in claim 8, wherein the average processing time is updated every time each processor completely processes the predetermined amount of data in the second process.

10. The control system as claimed in claim 6, wherein when data supplied to a processor assigned to the first process waits to be processed by the processor, said first determining means determines that the number of processors assigned to the first process is insufficient.

11. The control system as claimed in claim 6, wherein said first determining means comprises:
- calculating means for calculating an average processing time for which each processor processes a predetermined amount of data in the first process; and
- comparing means for comparing a waiting time and the average processing time to each other, the waiting time being a time for which data for the first process waits to be processed by one of the processors assigned to the first process, wherein when the waiting time is equal to or greater than the average processing time, said determining means determines that the number of processors assigned to the first process is insufficient.

12. The control system as claimed in claim 11, wherein the average processing time is updated every time each processor completely processes the predetermined amount of data in the first process.

* * * * *